United States Patent [19]

Skipper

[11] 4,344,774

[45] Aug. 17, 1982

[54] DEGASSER

[76] Inventor: Uvon Skipper, 7409 S. Rice Ave., Bellaire, Tex. 77401

[21] Appl. No.: 246,401

[22] Filed: Mar. 23, 1981

[51] Int. Cl.³ .............................................. B01D 19/00
[52] U.S. Cl. ........................................ 55/41; 55/52; 55/55; 55/191; 55/203
[58] Field of Search .............. 55/41, 52, 55, 189–193, 55/195, 199, 203, 207; 415/72, 74

[56] References Cited

U.S. PATENT DOCUMENTS

| | | | |
|---|---|---|---|
| 2,142,270 | 1/1939 | Henst | 55/193 |
| 2,737,857 | 3/1956 | Lee | 55/199 X |
| 3,077,932 | 2/1963 | Gehrke | 415/72 X |
| 3,201,919 | 8/1965 | Long | 55/191 X |
| 3,221,661 | 12/1965 | Swearingen | 415/72 X |
| 3,229,449 | 1/1966 | Hogue | 55/193 |
| 3,271,929 | 9/1966 | Bowden et al. | 55/203 X |
| 3,325,974 | 6/1967 | Griffin et al. | 55/193 |
| 3,686,826 | 8/1972 | Saunders et al. | 55/203 X |
| 3,856,483 | 12/1974 | Rumpf et al. | 55/203 X |
| 3,973,930 | 8/1976 | Burgess | 55/41 |
| 4,199,332 | 4/1980 | Krohn et al. | 55/191 |
| 4,214,879 | 7/1980 | Whetstone et al. | 55/191 |
| 4,272,258 | 6/1981 | Shifflett | 55/203 X |

FOREIGN PATENT DOCUMENTS 687343  5/1964  Canada .................................. 55/203

Primary Examiner—Robert H. Spitzer
Attorney, Agent, or Firm—Gunn, Lee & Jackson

[57] ABSTRACT

For use in degassing drilling mud, an improved apparatus is disclosed in the illustrated and preferred embodiment which incorporates an upstanding hollow cylindrical housing having a rotatable shaft therein. The shaft is centered within the housing and supports the flights of a screw conveyor. The screw conveyor flights are not spaced evenly; they are spread at the lower end of the equipment and are closer together at the upper end of the shaft to provide variations in volume to change velocity and pressure during separation. Moreover, the flights slope downwardly. The cylindrical housing has an opening into a circular manifold at the bottom for receiving mud. Mud is introduced to the screw and is forced upwardly on rotation of the shaft. The cylindrical housing is perforated at the upper end to enable the drilling mud to spill out of the cylindrical housing and to fall into a delivery manifold. Gas is forced from the mud by the lifting action of the screw and continues to flow upwardly to an exhaust manifold. It is sucked from the cylindrical housing by means of a fan. The mud is thus degassed for subsequent reuse.

10 Claims, 1 Drawing Figure

U.S. Patent
Aug. 17, 1982
4,344,774
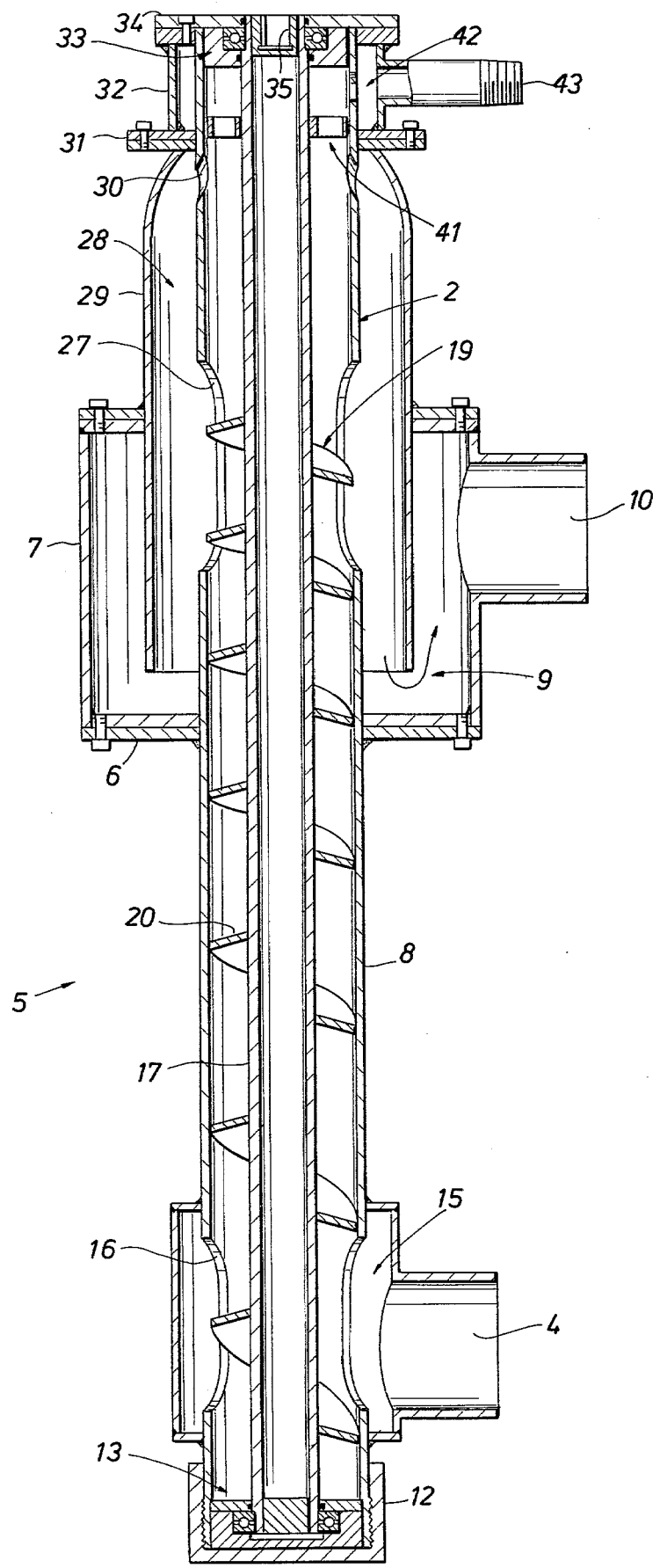

DEGASSER

BACKGROUND OF THE DISCLOSURE

This apparatus is directed to an improved degasser. The degasser of this disclosure should be contrasted with the teaching of the art in degassers. As an example, the patent of Long U.S. Pat. No. 3,201,919 shows a degasser with a cylindrical housing and screw. By and large, a vortex is achieved in that device which moves the gas bubbles inwardly towards the axis of the rotating shaft. The Griffin U.S. Pat. No. 3,325,974 refers more aptly to spray tanks and the like. U.S. Pat. No. 3,856,483 shows a large bowl which rotates with a very thin film on it. The thin film is subjected to centrifugal forces. The heavier mud particles are centrifuged outwardly along the bowl and surrender their gas bubbles. Perhaps the vertically deployed screws in U.S. Pat. Nos. 3,229,449 and 4,199,322 disclose devices with a helical screw. In the '449 patent, a helical screw lifts the slurry of interests to enable it to cascade over a series of degassing plates 18, 19, 20 and 21. As it tumbles downwardly, degassing is encouraged. In the other, a helical screw leaves a central void to enable gas to rise in the central void.

The apparatus of this disclosure accomplishes degassing in an improved manner. Moreover, this apparatus has a central upstanding main housing which is axially hollow. Gas cut mud is introduced into it to be lifted by a helical screw. The helical screw extends above the topmost part of the cylindrical housing. It lifts the mud as far as the mud can travel, the mud spilling out through a laterally located opening. It extends taller, defining a gas flow path upwardly out through an exhaust fan. This feature coupled with variations in the spacing of the flights of the auger separates the mud from the gas which is entrained in the mud. This separation is enhanced by sloping the auger downwardly as it extends outwardly. In other words, the auger, when considered in cross-section, discloses a slight downwardly slope extending to the outer edge of the auger. This slope permits the heavier particles to travel to the outside under the urging of centrifugal forces and gravity forces. As this movement occurs, the gases are removed from the mud as they rise between the flights of the auger. The gas is drawn from the mud because some separation occurs in the auger. The separation is made complete when the mud spills off the top of the auger and is removed laterally. The auger thus removes bubbles of gas from the mud.

From the foregoing, it will be understood that a conventional auger for transporting drilling mud is not sufficient. It is improbable that a conventional auger arranged within a cylindrical housing and positioned vertically in drilling mud for lifting the mud will effect a good gas separation from drilling mud. Inevitably, there is separation of gas from mud even if the mud is simply stored in an open top container; there is some enhancement in separation if the mud is churned or stirred by any kind of stirring device. However, both these factors are rather minor in importance compared with the total volume of gas that might be entrained in drilling mud. Agitation and exposure of the surface of the drilling mud to atmosphere are not overly enhanced by apparatus of the prior art. This apparatus is a marked advance in that the drilling mud is picked up by a rotating helical screw, the flights of the screw being shaped in such a manner as to initiate separation of the mud and gas, and the screw being further arranged within a vented and ducted housing whereby extracted gas is safely removed. The risk of explosion is reduced in the near vicinity and the gas is removed safely; the mud is nearly restored to or near its original and intended density or weight.

The present apparatus is thus summarized as a degasser which is comprised of an elongate cylindrical tubular housing which encloses a shaft. It is open at the top and bottom. The shaft supports the flights of a helical screw, the preferred form of the apparatus comprising an elongate helical screw wherein the flights are spaced widely at the bottom and they are closer together at the top. Moreover, the helix is affixed at a downwardly inclined angle to the shaft. The cylindrical housing is hollow and has openings at the bottom. The openings at the bottom receive mud from an intake manifold. The cylindrical housing has openings in the side at the top. The openings which are made in the cylindrical housing at the top void mud which is lifted after degassing. They open into a surrounding delivery chamber. The mud is permitted to cascade downwardly into the chamber and is removed. The chamber has an upper area which is perforated to define an exhaust chamber, and a fan located on the shaft at the top end of the apparatus exhausts air and all desolved gas, the fan being located to vent the exhaust chamber at the top of the cylindrical housing. The vented air and gas mixture is removed through an isolated hood which collects gas and directs it out through the fan and through an outlet.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawing, which drawing forms a part of this specification. It is to be noted, however, that the appended drawing illustrates only typical embodiments of the invention and are not to be considered limiting of its scope, for the invention may admit to other equally effective embodiments.

The single drawing is a sectional view through the apparatus of the present disclosure illustrating details of construction thereof.

In the drawings, the numeral 5 identifies the degasser of the present invention. This degasser is constructed of metal components and is shown without a power plant, the apparatus including a readily used connection for rotation. A suitable power source such as a 5-25 horsepower motor will suffice for its operation.

The degasser 5 includes a major structural member which is an elongate cylindrical housing 8. The housing 8 terminates at a lower thrust bearing assembly 13. This is received within a cap 12, the cap 12 being threaded to the cylindrical housing 8 which is in turn welded to an intake manifold 4. The intake manifold 4 includes a lateral port or opening. The port is in the form of an opening which empties into an enlarged cylindrical chamber 15. The chamber 15 is defined by a concentric wall larger than the diameter of the housing 8. It is welded to it. Moreover, the cap 12 seals the lower end of the apparatus. A thrust bearing assembly is included within, and the thrust bearing assembly supports an aligned shaft 17 which rotates within the housing 8.

Mud flows into the annular cavity between the shaft 17 and the housing 8 by flowing through the ports 16.

The lower end of the shaft 17 is supported axially within the housing 8 and is free to rotate. The shaft 17 is aligned for rotation. The shaft 17 supports a helical screw 20. The screw is made of multiple flights. That is to say, a single screw continuously encircles the shaft 17. While a single screw is shown, two or more can be used but it is not necessary to incorporate additional turns in this fashion. Rather, the single turn screw 20 has multiple flights which are spaced relatively far apart at the lower end of the housing 8. There, spacing is quite wide; the spacing changes in a controlled fashion from wide spacing to narrow spacing at the top end of the housing 8. The spacing can vary in another fashion to provide a change in velocity and pressure during lifting to aid the separation of the gas cut mud. The screw 20 thus changes pitch along the entire length.

The screw is formed by welding the multiple turns of the screw to the rotating shaft 17. As shown in the sectional view, the screw actually slopes downwardly as it extends outwardly. In rotation, it describes an annular surface, and fits snuggly within the housing 8 so that little leakage occurs between the screw and the internal face of the housing. The several turns of the screw thus slope downwardly at a fairly uniform angle. This slope is best observed by viewing the screw in sectional view at a sectional cut line through the screw. This is particularly made clear in the single drawing.

The housing 8 extends into a mud tank, and the lower half of the apparatus is submerged in mud. Mud enters through the manifold 14. Mud fills the housing 8 at the lower end by flowing through the port 16. The mud collects near the bottom, and is lifted only on rotating the screw 20.

The auger 20 is of substantial length. It terminates at an upper flight 19. The flight 19 is the top most turn. It is to be contrasted with the lower flights which are spaced further apart. In other words, the top revolutions of the screw are quite close. The next revolutions or turns of the screw are further apart. The bottom turns are spaced at the greatest distance. Alternative auger flite variations will produce different velocity and pressure changes acting of the mud to aid separation. This separation may vary dependent on the need which may vary dependent on mud density, temperature, and other conditions.

The numeral 10 identifies a mud outlet manifold. It is constructed with a laterally extending port. It includes a cylindrical outer wall 7 which is concentric to the housing 8 and is larger in diameter. It is closed across the bottom by means of a bottom closure plate which is transversed to the housing, the plate being identified by the numeral 6. It defines an internal flow space or cavity 9. This flow space is for degassed mud. The gas cut mud is voided from the equipment and almost restored to its original mud density. The outlet manifold 7 is sized so that it delivers an adequate flow through the lateral port in the outlet manifold 10.

The outlet manifold is defined by an upper plate which is parallel to and spaced from the plate 6. These two plates define a donut shaped internal cavity which surrounds the housing 8.

The housing 8 has openings 27. This is near the top most flight 19. Mud flows out through the port or openings 27. It flows into a surrounding annular chamber 28 and is conducted downwardly. The chamber 28 is defined by a bell shaped overhanging skirt 29. The skirt 29 curves outwardly and extends downwardly, describing a parallel or concentric structure which is larger than the housing and smaller than the cylindrical member 7 which surrounds it. The annular space 28 between the two is a space which permits degassed mud to flow downwardly. The mud pours out and flows down on the interior at 28. Moreover, gas that still escapes from the mud is permitted to flow upwardly. The two are separated as a result of the difference in densities.

The housing 8 at its upper end 2 is perforated at 30 so that gas flowing upwardly through the annular space 28 returns to the interior of the housing. This upward flow of gas and air (drawn in some instances with the mud) flows to an exhaust system to be described. The bell shaped annular housing 29 is affixed to the lower end of a mounting plate 31. The mounting plate 31 supports an upstanding cylindrical collar 32. The collar 32 in turn supports a top plate which encases a bearing assembly 33. The bearing assembly is just below the top cover 34. The cover plate 34 is closed over, having a rectangular drive socket 35 as shown. A drive shaft can be alternatively used. A drive mechanism is engaged at the opening 35, this being provided to rotate the hollow shaft 17. The shaft 17 is joined to the non-round socket 35 to enable a motor or gear box to be connected to the shaft. It has been omitted for sake of clarity.

The housing 8 extends to the nether side of the top plate 34. It surrounds the bearing assembly 33. An annular space is formed in the housing 8, and a passage communicates to the exterior of the housing 8. This passage is identified by the numeral 42, and it is immediately adjacent to an outlet pipe 43. So to speak, the structure surrounding the very upper end of the housing 8 operates as a hood to collect the gases removed from the drilling mud.

Gas removal is assisted by a fan 41. The fan 41 is mounted on the rotating shaft 17. The shaft 17 supports the fan which is joined to it. The fan has a set of blades, the number of which can be varied, which forces air to flow upwardly. The fan pulls a partial vacuum to aid gas separation. This picks up any gas which is in the near vicinity and draws it upwardly. The path of flow of the gas removed from the mud has alternate paths. One path is upward flow through the housing 8. This path of flow extends to the fan 41. An alternate path is through the annular space 28 immediately surrounding the upper end of the housing. This flow path is directed upwardly to the fan 41 by the openings 30, this flow path being a parallel flow path.

Mud is centrifuged outwardly because it is heavier and at the same instant, bubbles of gas are relatively forced inwardly and upwardly. This draws the gas bubbles towards the surface of the mud. In a sense, it is arbitrary to speak of the mud as having a surface between flights of the auger; nevertheless, there is a centrifugal separation which tends to remove bubbles and the bubbles are relatively moved toward the center and towards the surface of the mud between flights. The auger slopes downwardly so that the mud spills downwardly at the opening 27. Moreover, the relatively heavy mud is centrifuged out of the housing. This enables the mud to flow downwardly, accumulating in the surrounding annular housing 10, and flowing out for reuse. Conversely, the gas flows upwardly in this system. It is particularly easy to recover the gas because there is a trap arranged by extension of the downwardly extending annular housing 29 which extends below the openings 27. This forces the gas to rise and prevents its escape with the mud. Further, the rising gas is evacuated under a pressure differential created by the rotating fan.

Several practical factors should be considered in the operation of this device. Drilling mud is relatively abrasive. To this end, the bearings on the shafts 17 should be sealed bearings. Moreover, the relative capacity of the fan 41 is in part dependent on the number and size of the blades. The fan is affixed to the shaft 17 in the preferred embodiment. Accordingly, it rotates at the same speed. If desired, higher speed can be obtained. To do this, the fan would have to be installed on the shaft 17 at the same location, but would be driven at a greater rate of speed. To this end, a bearing assembly would be required to support the fan 41 on the shaft. The fan rotates within the fixed housing 8, and a surrounding ring seal adjacent to the fan blade and on the interior of the housing may also improve the performance of the fan.

The relative dimensions of the auger should be noted. A suitable system is obtained with an auger of about 8–12 inches in diameter. The central shaft 17 can have a diameter in the range of 2–4 inches. While larger devices can be made, should the volume of mud require, it is probably more expedient to utilize two separate mud degassers in accordance with the teachings disclosed herein. Another scale factor is the relative bite of the auger which is a function of the pitch. The speed of the auger and the relative pitch are factors which can be varied. The pitch is not as easily varied and accordingly, the speed is more readily varied in response to factors such as mud weight, viscosity, temperature, extent of gas entrainment and the like.

While the foregoing is directed as preferred embodiment, the scope is determined by the claims which follow.

I claim:

1. A method of degassing drilling mud which comprises the steps of:
    (a) arranging an upstanding cylindrical housing having a central passage therethrough which passage terminates at a lower opening through said housing to admit drilling mud having gas therein and an upper opening through said housing;
    (b) rotating an auger within said cylindrical housing, said auger incorporating a means for lifting drilling mud for moving mud vertically along said cylindrical housing wherein this step varies the rate at which the mud is lifted along the auger and imposes a centrifugal force on the drilling mud to centrifugally force the heavier components of the mud radially outwardly within said housing during lifting to thereby centrifugally move gas bubbles in the drilling mud radially inwardly relative to the mud and wherein the lifting step is continued so that a selected portion of the mud is lifted from the lower opening in the housing to the upper opening thereof whereupon the mud disengages from the gas bubbles entrained therein;
    (c) evacuating the upper end of said housing through a forced gas flow means to remove gas;
    (d) collecting the mud that flows from the upper opening in said housing in a chamber means;
    (e) positioning a solid barrier in the chamber means extending from above and toward the chamber means to define a gas free region on one side of the barrier;
    (f) filling the chamber means to a depth to extend above the barrier to isolate gas liberated from the mud on one side of the barrier; and
    (g) withdrawing degassed drilling mud from the gas free side of the barrier.

2. The method of claim 1 further including the step of rotating a fan means coextensively with rotation of the auger to evacuate the upper end of the housing of gas.

3. The method of claim 2 including the step of drawing gas upwardly through the housing to evacuation by the fan means, and also drawing gas through the chamber means after mud flows from the housing into the chamber means; and removing mud from the chamber means by filling above a level at which mud flows out of the chamber means at an outlet formed in the chamber means for mud withdrawal.

4. The method of claim 1 wherein the pitch of the auger is varied to a smaller pitch near the upper end thereof and further wherein the auger is operated to centrifugally and through gravity force the mud lifted in said housing relatively outwardly towards the upper opening in the housing.

5. The method of claim 1, 2 or 4 further including the step of surrounding the upper end of the housing by an encircling and enclosing structure defining an annular space about the housing and on the interior of the barrier, and including the step of continuously evacuating this annular space through positive air flow for removal of gas while forcing degassed mud to flow beneath the barrier.

6. The method of claim 1, 2 or 4 further including the step of inclining the flights of the auger at an angle to slope downwardly outwardly with respect to a support shaft for rotating the auger and further including the step of operating the auger at an upright position such that drilling mud supported on the flights of the auger tends to flow away from a central shaft supporting the flights of said auger and the flights are sufficiently close to the housing that mud is lifted in contact with the housing and above the flights.

7. Apparatus for removing gas from drilling mud which apparatus comprises:
    (a) an upstanding cylindrical housing having a wall and having openings at the bottom thereof wherein drilling mud having gas therein is permitted to flow into said housing and also having an opening in the wall to enable mud to flow out of said housing;
    (b) a multi-turn auger having a central support shaft extending along said cylindrical housing between the inlet and outlet openings thereof which auger is positioned for rotating within said housing;
    (c) flights on said auger which have a variable pitch from turn to turn thereof wherein the flights of the auger are spaced further apart near the lower end thereof in comparison with the upper end thereof;
    (d) means for joining the flights of the auger to the central support shaft inclining the flights radially outwardly downwardly such that the flights of said auger, on rotation about said shaft, causes mud to flow from said inlet opening to said outlet opening and to simultaneously lift the mud while centrifugally forcing the mud toward said cylindrical housing and away from said central shaft supporting said auger wherein the operation of said auger centrifugally separates dissolved gas in the drilling mud;
    (e) U-tube means connected to receive mud flow from said outlet openings of said housing to flow the mud toward a U-tube means outlet means and beneath a barrier isolating gas flow from said outlet means; and (f) gas evacuation means drawing gas from said housing at the upper end thereof and from said U-tube means for evacuation of gas liberated from the mud.

8. The apparatus of claim 7 further including a downwardly opening annularly spaced encircling closure means for accumulating and directing upwardly in a confined pathway gas which escapes from the drilling mud as it flows through said outlet means; and fan means for continuously evacuating gas in the upper portions of the said cylindrical housing.

9. The apparatus of claim 8 further including passage means communicating said annular space with said fan means, and further including an outlet passage means extending from said fan means for removal of gas.

10. The apparatus of claim 7, 8 or 9 further including an encircling annular chamber means comprising said U-tube means for collecting drilling mud and further wherein said chamber means includes a bottom closure member which accumulates drilling mud thereon to raise the level of drilling mud therein to a level to flow away therefrom through an outlet means.

* * * * *